United States Patent [19]

Satoh

[11] 4,325,080
[45] Apr. 13, 1982

[54] APPARATUS FOR DISPLAYING VIDEO TRACK NUMBER IN VIEWFINDER OF VIDEO CAMERA

[75] Inventor: Ken Satoh, Akigawa, Japan

[73] Assignee: Olympus Optical Co., Ltd., Tokyo, Japan

[21] Appl. No.: 137,774

[22] Filed: Apr. 7, 1980

[30] Foreign Application Priority Data

Apr. 24, 1979 [JP] Japan ................................. 54-50684
Apr. 24, 1979 [JP] Japan ................................. 54-50685

[51] Int. Cl.³ .......................... H04N 5/26; H04N 5/78
[52] U.S. Cl. .................................... 358/127; 358/224
[58] Field of Search ............ 358/127, 183, 224, 192.1; 340/721, 722, 747

[56] References Cited

U.S. PATENT DOCUMENTS

3,502,804  3/1970  Barr ..................................... 358/224
3,993,864  11/1976 Pye et al. ............................ 358/183
3,995,259  11/1976 Harris et al. ...................... 340/722 X
4,081,797  3/1978  Olson ............................... 358/192.1
4,195,317  5/1980  Stratton ................................ 360/14

OTHER PUBLICATIONS

Hamalainen, "Videotape Editing Systems Using Microprocessors", SMPTE Journal, vol. 87, Jun. 1978, pp. 379-382.
Doyle et al., "Some Applications of Digital Techniques in TV Receivers", August, 1972, pp. 245-248.
Mar., 1970 Journal of the SMPTE, vol. 79, pp. 194-197.

Primary Examiner—Vincent P. Canney
Assistant Examiner—Donald McElheny, Jr.
Attorney, Agent, or Firm—Frishauf, Holtz, Goodman and Woodward

[57] ABSTRACT

A video track display apparatus comprises a track position signal generator for producing a first signal representing the position of a track being used for video recording or playback, a window circuit for producing a second signal for determining a fixed position in one frame according to horizontal and vertical synchronizing signals and a character generator for producing a third signal for producing a character or characters to be displayed in the fixed position in one frame from the first and second signals. The character or characters is or are displayed on a view finder of a video camera or on the screen of a picture display apparatus according to the third signal.

9 Claims, 6 Drawing Figures

APPARATUS FOR DISPLAYING VIDEO TRACK NUMBER IN VIEWFINDER OF VIDEO CAMERA

BACKGROUND OF THE INVENTION

This invention relates to a video track display apparatus for displaying the track number of a track being used for video recording in the viewfinder of a video camera having an electric view finder.

Where a video tape having a plurality of recording tracks is used, it is convenient if the track number of a track being used for video recording is displayed on a view finder of the camera. From this track number it is possible to know not only which track is being used but also the number of remaining tracks that can be used for video recording. It is also convenient to provide such track number display when making playback with a playback CRT.

SUMMARY OF THE INVENTION

The invention is predicated in the above aspect, and its object is to provide a track number display apparatus which can display the track number of a track being used for video recording or playback.

To achieve the above object, a first embodiment of the video track display apparatus according to the invention comprises a track position signal generation circuit to produce a first signal representing the position of the track being used for video recording or playback, a window circuit to produce a second signal for determining a fixed position in one frame on the basis of the horizontal and vertical synchronizing signals, and a character generation circuit to produce a third signal corresponding to a character or characters, which is or are displayed in the fixed position in one frame for indicating the track position, from the first and second signals. The display of the character or characters on a view finder of a video camera or on the screen of a picture display apparatus is obtained according to the third signal.

Also, to achieve the above object a second embodiment of the video track display apparatus comprises a means for providing a track position signal representing the position of the track being used for video recording or playback, and a character display means provided within a view finder of a video camera or a visible region of a picture display apparatus including the picture display area. A character or characters corresponding to the track position signal is or are displayed on the character display means.

Thus, with the video track display apparatus according to the invention it is possible to know the track number of the track being used for video recording while observing the foreground subject through a view finder of a camera.

DESCRIPTION OF THE PREFERRED EMBODIMENTS

Figure 1:
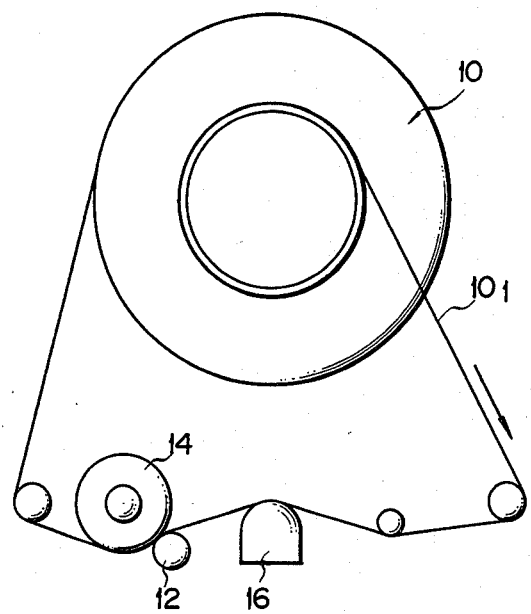
FIG. 1 is a schematic view showing a tape transport mechanism of a multi-track video recorder/player using an endless tape.

Now, preferred embodiments of the invention will be described. For the purpose of avoiding repetition of description, like parts are designated by like reference numerals.

A first embodiment of the video track display apparatus according to the invention will now be described with reference to FIGS. 1 to 6. FIG. 1 shows a tape transport mechanism of a multi-track video recorder/player using an endless tape 10. The tape, as shown at $10_1$, is driven by a capstan 12 and a pinch roller 14 and proceeds at a constant speed. The tape $10_1$ usually has a few to several tens of recording tracks, and video signals are recorded in each of these tracks. The video signal is recorded or played back via a head 16. The video recorder/player itself does not constitute the subject matter of this invention. Since it can be constructed with prior-art techniques, its details are not discussed here.

Figure 2:
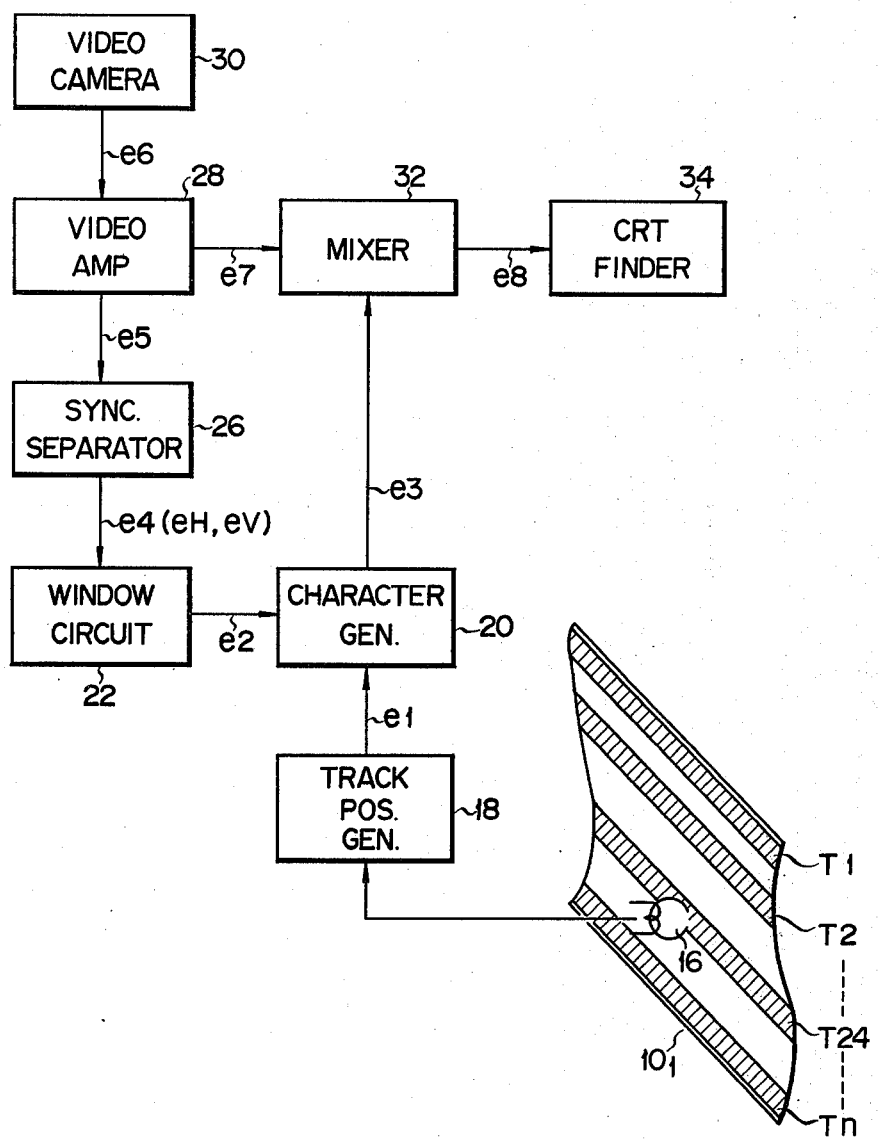
FIG. 2 is a block diagram showing an embodiment of the video track display apparatus according to the invention.

FIG. 2 is a block diagram showing the construction of a video track display apparatus according to the invention. Here, the head 16 is shown in contact with the twenty fourth track T24 on the tape $10_1$. A first signal e1 representing the track number "24" of this track is produced by a track position signal generator 18. As an example, a case where tracks are switched with movement of the head 16 in the direction of the width of the tape $10_1$ (i.e., vertical direction in the Figure) is considered. The generator 18 is assumed to include a multi-contact switch or counter which is switched or counted according to the position of the head 16 relative to the tape $10_1$. This switch may be either a mechanical switch or an electrical switch. In this case, the first signal e1 representing the track position T24 corresponding to the track number "24" can be obtained from the contact selection state of the switch or the content of the counter. The first signal e1 is coupled to a character generator 20. The character generator 20 then produces a third signal e3 which is a video signal representing a number "24".

The timing of generation of the signal representing the number "24" in the generator 20 is determined by a second signal e2; that is, the third signal e3 representing the number "24" is synchronized to the second signal e2. This second signal e2 is produced from a window circuit 22, which is operated under the control of a fourth signal e4 supplied from a synchronizing separator 26. The fourth signal e4 contains a horizontal synchronizing pulse signal eH and a vertical synchronizing pulse signal eV. In one frame, the horizontal position of the third signal e3 indicating the number "24" is synchronized to the signal eH, and the vertical position of the third signal e3 is synchronized to the signal eV. The number "24" is stably displayed in a fixed position of one frame in accordance with the second signal e2, which is synchronized to the pulse signals eH and eV.

The horizontal and vertical synchronizing pulse signals eH and eV separated by the separator 26 are contained in a fifth signal e5 derived from a video signal processing circuit or video amplifier 28, to which the output of a video camera 30, i.e., a video signal, is coupled as a sixth signal e6. The sixth signal is converted by the video amplifier 28 into a seventh signal (program video signal) e7 with a suitable signal level for coupling to a mixer 32. The mixer 32 also receives the third signal e3 (character video signal). The seventh and third signals e7 and e3 are combined in the mixer 32 into an eighth signal e8 which is provided to a CRT 34. The eighth signal e8 is a combination of the program video signal and character video signal and is an analog signal of the same kind as the brightness modulation signal in the ordinary television receiver set. The CRT 34, comprises an electric view finder within the video camera 30.

Figure 3:
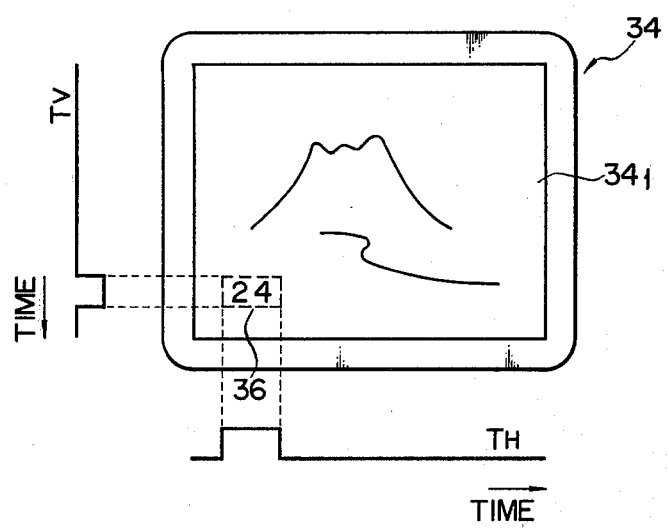
FIG. 3 is a view showing a picture displayed on a CRT or view finder 34 in the embodiment of FIG. 2.

The eighth signal e8 coupled to the CRT 34 is reproduced as an image on, for instance, a picture screen as shown in FIG. 3. The mountainous scene displayed on the screen $34_1$ is based upon the seventh signal e7, and the track number "24" which is a track position display 36, is based upon the third signal e3.

Figure 4:
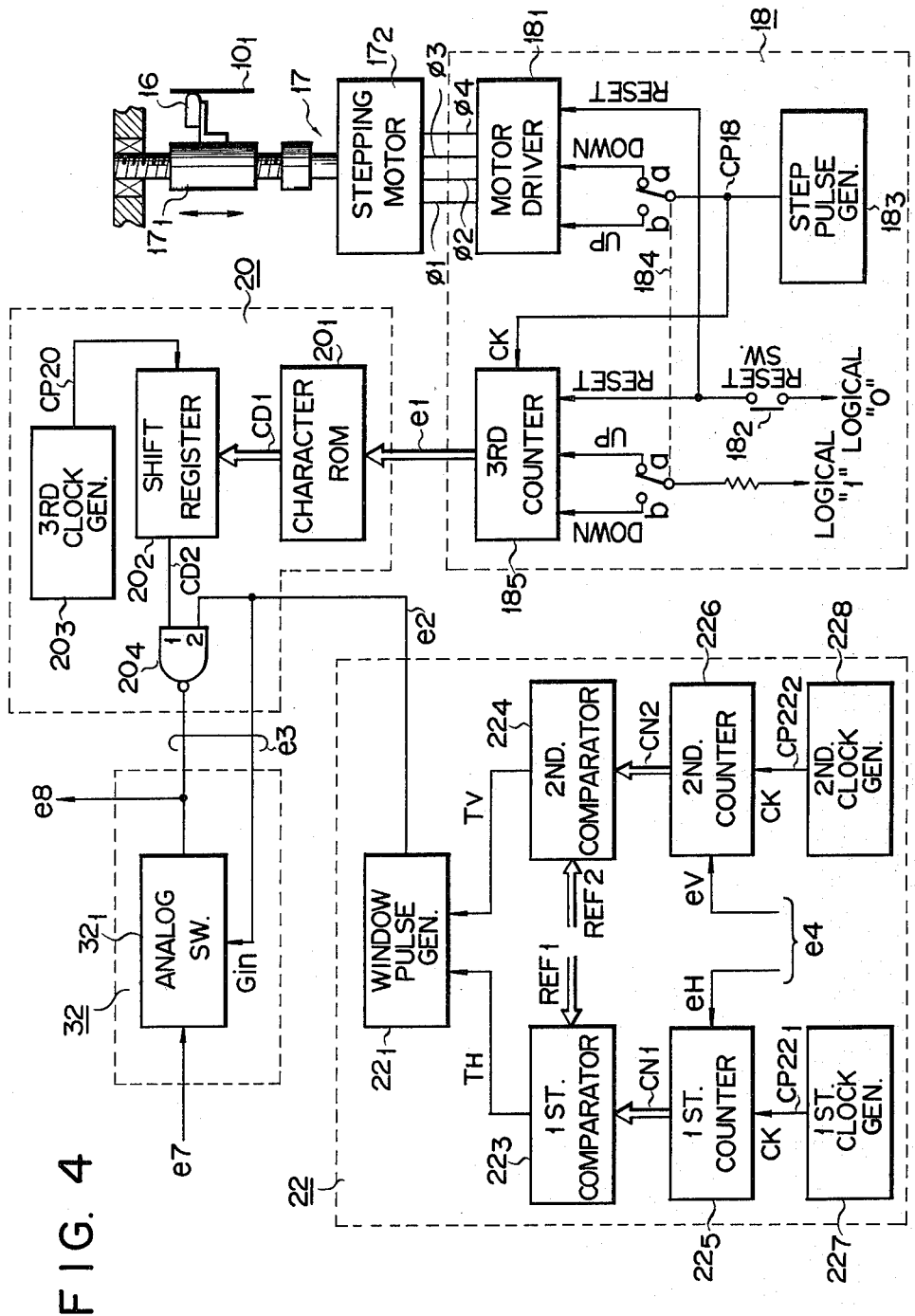
FIG. 4 is a block diagram showing part of the block diagram of FIG. 2 in further detail.

FIG. 4 shows a block diagram of the track position signal generator 18, character generator 20, window circuit 22 and mixer 32 of the embodiment of FIG. 2 in detail. In FIG. 4, a screw feed mechanism or track switching mechanism 17 for shifting the head 16 in the width direction of the tape $10_1$ is shown. The head 16 is mounted on a head feeder base $17_1$ which can be vertically moved to a predetermined extent according to the direction and angle of rotation of a stepping motor $17_2$. The motor $17_2$ may be a conventional 4-phase stepping motor, and in this case it is driven by a conventional 4-phase motor driver $18_1$.

When the motor driver $18_1$ is reset by a reset switch $18_2$, 4-phase signals $\phi 1$ to $\phi 4$ for shifting the head 16 to a position corresponding to that of the first track T1 in the tape $10_1$ is supplied from the motor driver $18_1$ to the motor $17_2$. When a track switching clock pulse signal CP18 produced from a stepping pulse generator $18_3$ through an UP/DOWN select switch $18_4$, which is a two-gang and two-contacts type switch, to a DOWN input terminal of the motor driver $18_1$, the signal level combination of the signals $\phi 1$ to $\phi 4$ is changed according to the number of pulses in the pulse signal CP18. According to the change of the signal level combination of the signals $\phi 1$ to $\phi 4$, the motor $17_2$ is rotated in a first direction by a predetermined angle to shift the head 16 to a different track position. For example, when a single pulse is produced as the pulse signal CP18, the motor $17_2$ is rotated 90 degrees in the counterclockwise direction to move down the head 16 for one track pitch. In other words, with the first pulse of the pulse signal CP18 the position of the head 16 is switched from that corresponding to the first track T1 to that corresponding to the second track T2.

The pulse signal CP18 is also coupled with a clock input terminal CK of a third counter $18_5$. The content of the counter $18_5$ is cleared, for instance to "00000", by the reset switch $18_2$. The content of the counter $18_5$ is incremented by "1" every time it receives a pulse of the signal CP18. For example, when 23 pulses of the pulse signal CP18 are produced after the switch $18_2$ is turned on, the head 16 is shifted to a position corresponding to the twenty fourth track T24, and the content of the counter $18_5$, i.e., a first signal e1, becomes "10111" in binary code.

The first signal e1, which is a 5-bit binary code now being "10111", is coupled to a character ROM $20_1$, whereupon a character data CD1 corresponding to the number "24" is produced from an address location in the ROM $20_1$ corresponding to "10111", for instance an address "24". The ROM $20_1$ serves here as code converter. The data CD1 is loaded in a shift register $20_2$. When the loading of this data is completed, a shift pulse signal CP20 is supplied from a third clock generator $20_3$ to the shift register $20_2$ in a given timing. For each pulse of the pulse signal CP20, the data CD1 loaded in the shift register $20_2$ is provided therefrom as character data CD2 as a time sequential signal. This means that the shift register $20_2$ serves as parallel-to-serial data converter.

The data CD2 is connected through a first input terminal of a NAND gate $20_4$ and added to the output of an analog switch $32_1$ in the mixer 32 to produce the eighth signal e8. The second signal e2 is coupled to a second input terminal of the NAND gate $20_4$ and also to a gate input terminal $G_{in}$ of the analog switch $32_1$. When the second signal e2 is a logical "1", the analog switch $32_1$ is "closed", and the NAND gate $20_4$ is "opened". At this time, the eighth signal e8 appears as the data CD2 corresponding to the number "24". On the other hand, when the second signal e2 is a logical "0", the analog switch $32_1$ is "opened", and the NAND gate $20_4$ is "closed". At this time, the eighth signal e8 appears as the seventh signal e7, i.e., the video signal.

The second signal e2 is produced from a window pulse generator $22_1$ when horizontal and vertical timing signals TH and TV are produced. The signals TH and TV are produced from respective first and second comparators $22_3$ and $22_4$. The comparator $22_3$ produces the signal TH when a count data CN1 coupled to it is within the range of a first reference data REF1. The comparator $22_4$ produces the signal TV when a count data CN2 coupled to it is within the range of a second reference data REF2. For example, if the range of the data REF1 is between decimal numbers 20 and 40, the signal TH is produced when $20 \leq CN1 < 40$. Likewise, if the range of the data REF2 is between 450 and 500, the signal TV is produced when $450 \leq CN2 < 500$. The data CN1 is produced from a first counter $22_5$, which is reset by the horizontal synchronizing pulse eH and counts pulses of a first clock pulse signal $CP22_1$. The data CN2 is produced from a second counter $22_6$, which is reset by the vertical synchronizing pulse eV and counts pulses of a second clock pulse signal $CP22_2$. The pulse signal $CP22_1$ is produced from a first clock generator $22_7$ which is synchronized to the pulse eH, and the pulse signal $CP22_2$ is produced from a second clock generator $22_8$ which is synchronized to the pulse eV.

It will be seen from the above description that the second signal e2 is produced in a timing corresponding to a fixed position in the screen of the CRT 34, which is determined by the reference data REF1 and REF2, i.e., a position in which the number "24" is displayed as the track position display 36. FIG. 3 also shows the relation of the track position display 36 to the signals TV and TH.

The displayed number "24" in the track position display 36 is changed in accordance with the generation of the pulse signal CP18 or resetting operation of the reset switch $18_2$. When the switch $18_2$ is turned "on", the head 16 is shifted to the position corresponding to the first track in the tape $10_1$, and "1" or "01" is displayed as the track position display 36. When 23 consequential pulses of the pulse signal CP18 are produced where the two-gang switch $18_4$ selects a contact a, the head 16 is shifted down to a position corresponding to the twenty fourth track, and "24" is displayed as the track position display 36. If further four pulses of the pulse signal CP18 are produced in this state, the head 16 is further shifted down to a position corresponding to the twenty eighth track, and "28" is displayed. Thereafter, if the switch 18₄ is switched to the side of a contact b and two pulses of the signal CP18 are subsequently produced, the head 16 is shifted up to a position corresponding to the twenty sixth track, and "26" is displayed.

Figure 5:
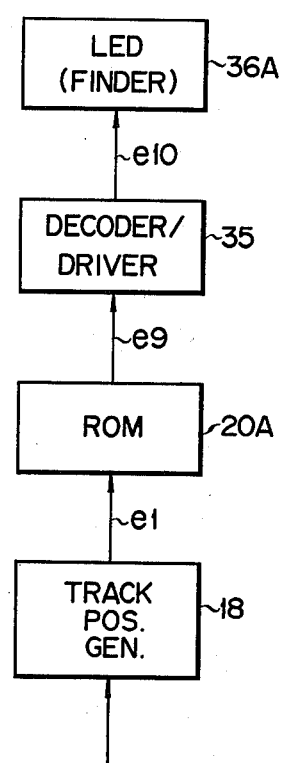
FIG. 5 is a block diagram showing another embodiment of the invention.

FIG. 5 is a block diagram showing the construction of a second embodiment of the video track display apparatus according to the invention. In the Figure, the head 16 is shown in contact with the twenty eighth track T28 of the tape $10_1$. Here, the first signal e1 representing the track number "28" of this track is produced from the track position signal generator 18. When this track number "28" is represented by a binary code, the first signal e1 at this time is, for instance, a 5-bit binary code "11011".

The first signal e1 is given as a read command signal to a ROM 20A, in which predetermined numerals or characters are previously stored. When the data "11011" is given as the first signal e1, a BCD code "0010 1000" representing the number "28" is produced as a ninth signal e9 from, for instance, a twenty eighth address in the ROM 20A. The ROM 20A serves as code converter like the ROM $20_1$ shown in FIG. 4. The ninth signal e9 is converted by a decoder/driver 35 into a corresponding 7-segment display code. The code conversion output of the decoder/driver 35 is supplied as a tenth signal e10 to the 7-segment type LED numeral display unit 36A which is provided within the view finder of the camera 30 shown in FIG. 2. As a result, the track number "28" of the track being in use for the video recording is displayed within the view finder.

Figure 6:
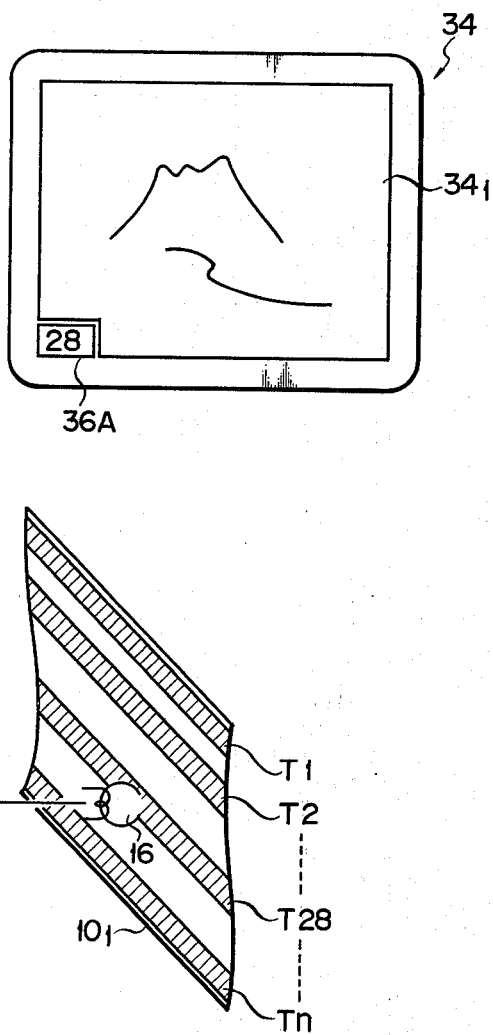
FIG. 6 is a view showing a view finder 34 including LED display unit 36A shown in FIG. 5.

FIG. 6 shows how the track number "28" is displayed within the view finder 34 in the camera. In this way, the LED display unit 36A permits one to know the track number of the track being used for video recording.

As has been described in the foregoing, with the track number display apparatus according to the invention the number of tracks having been used for video recording can be displayed within the view finder of a television camera. Since the camera operator can always know the number of tracks having been used for video recording, he can tell how much recording can still be made with the tape being used during recording, that is, he can know the remaining tape tracks while monitoring the picture. Instead of the number of tracks having been used, the number of remaining tracks may be displayed in case where a display for remaining tracks is desired.

The constructions described above with reference to FIGS. 1 to 6 are by no means limitative, and various changes and modifications in the details of the construction are possible without departing from the scope and spirit of the invention as defined the claims. For example, while the above description with reference to FIG. 2 or 5 has been concerned with the case of displaying the number of tracks having been used in video recording within the view finder, the track number may also be displayed in playback with a monitor TV for convenience. In this case, the operation of the video camera 30 may be stopped, and the output signal from the head 16 may be subjected to a conventional signal processing and then coupled to the video amplifier 28. Further, while the use of the endless tape 10 has been mentioned with reference to FIG. 1, the invention may also be applied to a two-tape-reel type multi-channel tape drive system having auto-reverse/auto-repeat functions. Furthermore, while the description with reference to FIG. 2 or 5 has been concerned with the case of mechanically shifting a single head 16, the invention may also be applied to a stationary or fixed type multi-channel head. In this case, the first signal e1 is produced in accordance with the selection state of each track section of the multi-channel head. Further, it is possible to switch the track number display for indicating the number of tracks having been used and that for indicating the number of remaining tracks. Further, switching of tracks for use in video recording may be made one track after another or by jumping several tracks.

What is claimed is:

1. Video track display apparatus for a multi-track video tape recorder (VTR) and adopted to a video camera having an electric viewfinder, said video track display apparatus comprising:
    track position signal generator means coupled to the video tape recorder for producing a first signal representing the position of a track being used for video recording or playback;
    window means for producing a second signal for determining a fixed position in a frame from horizontal and vertical synchronizing signals;
    character generator means coupled to said window means and to said track position signal generator means and responsive to said first and second signals for producing a third signal defining at least one character representing said track position and defining said fixed position in a frame at which said at least one character is to be displayed in said viewfinder of said video camera; and
    means coupled to said video camera and to said character generator means and responsive to said third signal for displaying said at least one character in said video camera viewfinder at said fixed position in a displayed frame.

2. The video track display apparatus of claim 1, further comprising:
    means for receving a first video signal produced by said video camera; and
    synchronizing signal separator means coupled to said receiving means for separating said horizontal and vertical synchronizing signals from a second video signal produced from said receiving means; and
    wherein said means responsive to said third signal comprises a mixer means coupled to said video signal receiving means for combining a third video signal corresponding to said first video signal and said third signal, and for supplying a frame display signal corresponding to a frame to be displayed to said viewfinder, said frame display signal including a portion constituted by said third video signal and a portion constituted by said third signal.

3. The video track display apparatus of claim 2, wherein said mixer means comprises switching means for selecting one of said third signal and said third video signal in a predetermined timing, and for coupling the selected signal to said viewfinder of said video camera for video display.

4. The video display apparatus of any one of claims 1, 2 or 3, wherein said at least one character representing said track position indicates the number of tracks that have already been used for video recording or playback.

5. The video track display apparatus of any one of claims 1, 2 or 3, wherein said at least one character representing said track position indicates the number of tracks that have not yet been used for video recording or playback.

6. A video track display apparatus for a multitrack (VTR) video tape recorder and coupled to a viewfinder arranged in a video camera for displaying frames of a video signal in the viewfinder of the video camera, said video track display apparatus comprising:

first means coupled to said video tape recorder for providing a track position signal representing the position of a track being used for video recording or playback;

second means coupled to said first means for providing a character signal corresponding to said track position signal; and a third means located within said viewfinder of each video camera and coupled to said second means for displaying at least one character representing said track position according to said character signal.

7. The video track display apparatus of claim 6, wherein said second means includes a code converter for converting said track position signal to said character signal.

8. The video track display apparatus of claim 6 or 7, wherein said at least one character representing said track position indicates the number of tracks that have already been used for video recording or playback.

9. The video track display apparatus of claim 6 or 7, wherein said at least one character representing said track position indicates the number of tracks that have not been used for video recording or playback.

* * * * *